United States Patent [19]

Smith et al.

[11] 4,406,360
[45] Sep. 27, 1983

[54] ACCUMULATING CONVEYER

[75] Inventors: Jason T. Smith, Hinsdale; Thomas A. Church, Woodridge; Theodore Johnson, Wheaton, all of Ill.

[73] Assignee: Conveyersmith, Inc., LaGrange, Ill.

[21] Appl. No.: 219,422

[22] Filed: Dec. 22, 1980

[51] Int. Cl.³ .............................................. B65G 13/071
[52] U.S. Cl. ...................................... 198/781; 198/469
[58] Field of Search ............... 198/780, 781, 790, 791, 198/460; 64/30 R, 30 C; 464/47

[56] References Cited

U.S. PATENT DOCUMENTS

| 3,756,042 | 9/1973 | Heth et al. | 64/30 C |
| 4,023,640 | 5/1977 | Frazer | 464/47 |
| 4,286,441 | 9/1981 | Scheueman | 198/781 |

FOREIGN PATENT DOCUMENTS

| 1075183 | 4/1980 | Canada | 198/781 |
| 1094498 | 1/1981 | Canada | 198/781 |

Primary Examiner—James G. Smith
Assistant Examiner—Douglas D. Watts
Attorney, Agent, or Firm—Krkland & Ellis

[57] ABSTRACT

An accumulating conveyer is provided in which rollers are utilized which have a drive mechanism with a driven load-engaging portion in permanent frictional engagement with a driving portion. The drive mechanism includes an adjustable bias means so that the driving force between a driving portion and a driven portion is adjustable according to the characteristics of the loads to be conveyed. A friction pad is positioned between a disc in the driving portion and a disc in the driven portion of the drive mechanism; the two discs are urged against the friction pad by a compression spring. When the weight of a load in contact with the driven portion is below a predetermined value, the friction between the friction pad and the two discs is sufficient to cause the two discs and the friction pad to rotate conjointly thereby coupling the driving portion to the driven portion. When the weight of the load, or the weight of the load plus other resistance to movement of the load, exceeds the predetermined value, slippage occurs between the friction pad and the two discs thereby uncoupling the driving portion from the driven portion. Only selected ones of the rollers include drive mechanisms, the number and spacing of rollers with drive mechanisms, the number and spacing of rollers with drive mechanisms being determined by characteristics of the loads to be conveyed. The conveyer can be used to column accumulate, and, with the addition of brakes actuated by a switching mechanism, to zone accumulate.

29 Claims, 5 Drawing Figures

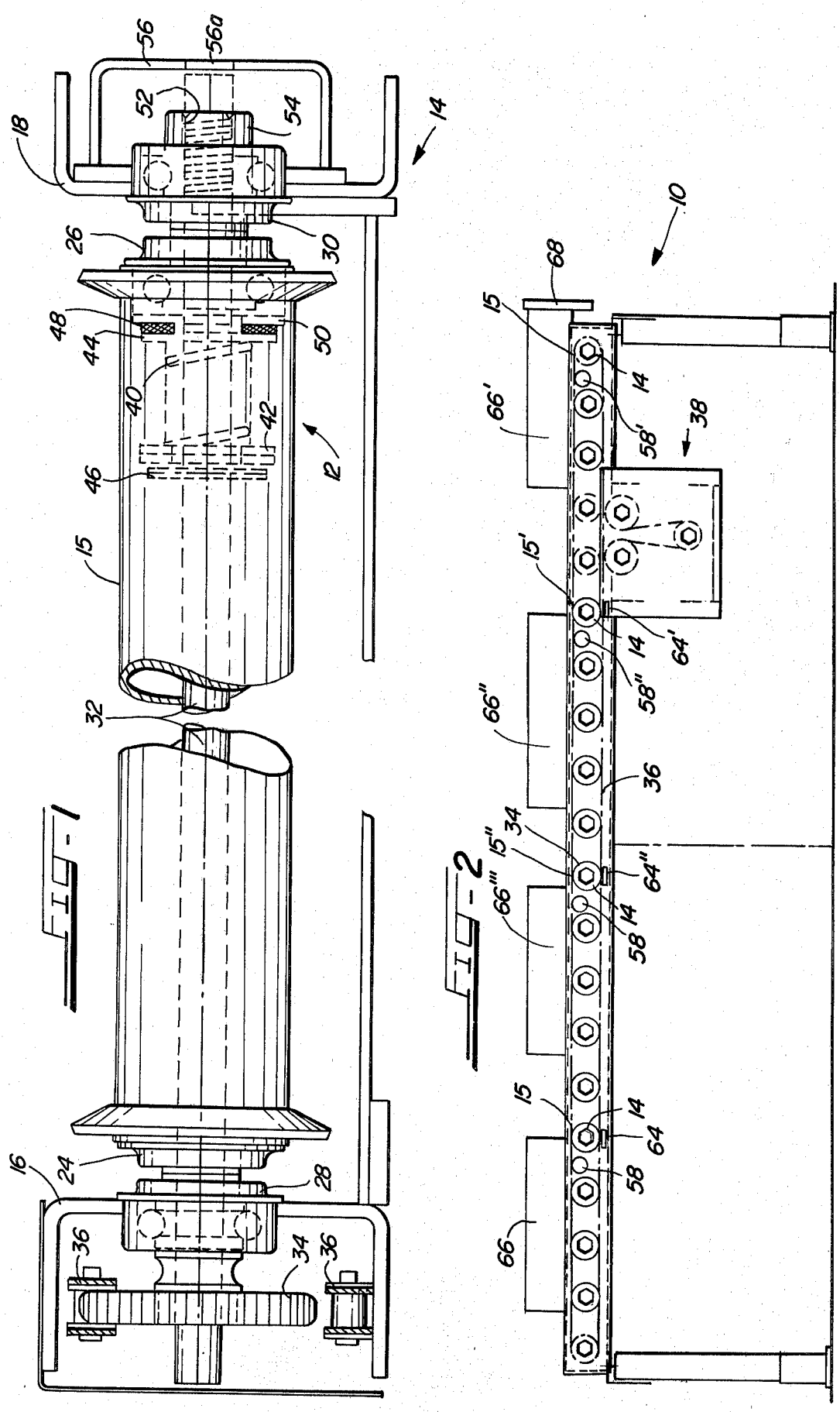

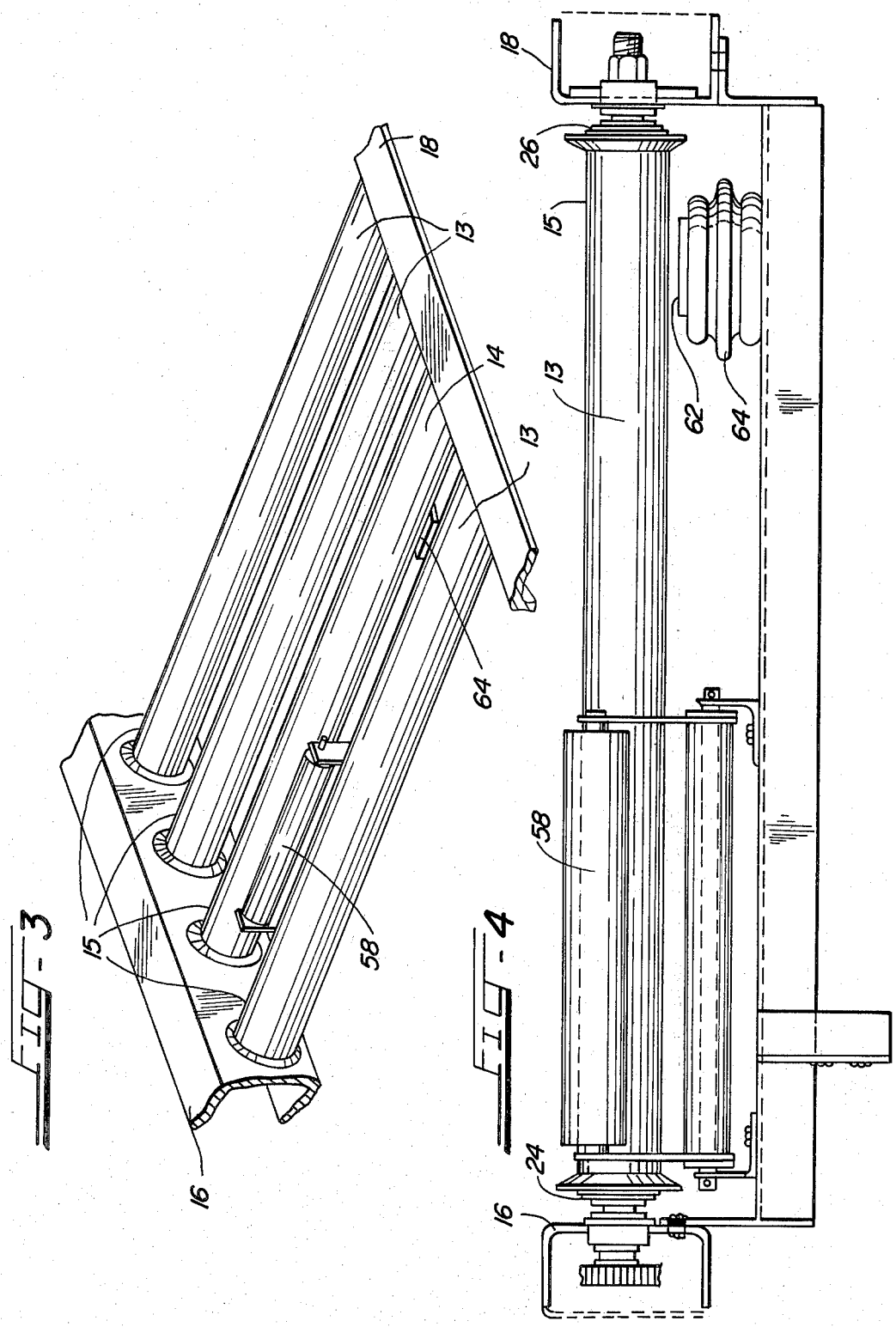

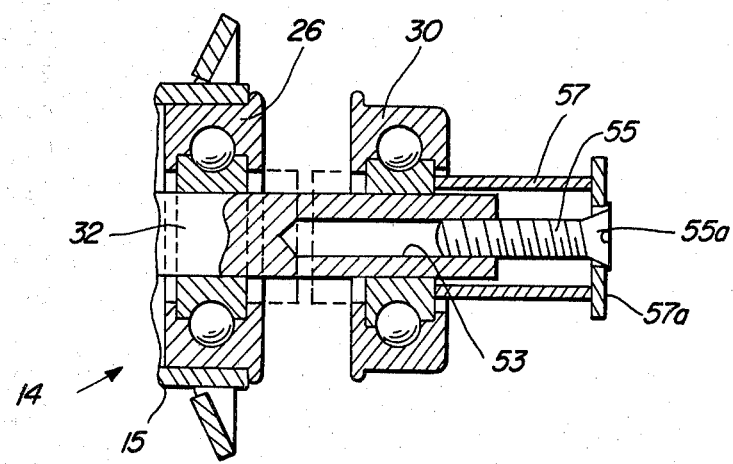

ACCUMULATING CONVEYER

BACKGROUND OF THE INVENTION

1. Field of the Invention

The present invention relates generally to a conveyer system and more particularly is directed to a new and improved accumulating conveyer capable of conveying loads having a wide range of predetermined weights, including heavy loads, and accumulating them either against each other (i.e., load-to-load or column accumulation) or in spaced relation to each other (i.e., zone accumulation).

2. Description of the Prior Art

Accumulating conveyers of various types are known in the prior art. Prior art conveyers suitable for carrying relatively heavy loads are generally of one of two types: roller flight conveyers and reciprocating gravity accumulating conveyers. Roller flight conveyers utilize rollers which are freewheeling and which only rotate by inertia when a load passes over them. The entire set of rollers, in a manner resembling an endless belt driven between two pulleys, is moved in a direction transverse to the axes of the rollers thereby carrying the loads along. Disadvantages of the roller flight type conveyers include the inability to vary the end pressure (i.e., the pressure which builds up as loads accumulate against each other) and the difficulty of using such conveyers to zone accumulate. Reciprocating gravity accumulating conveyers, the second type of conveyer presently used to convey heavy loads, operate by shuttling freewheeling rollers back and forth while the loads move by gravity. Conveyers of this type have the disadvantage of being incapable of zone accumulating. Further disadvantages of reciprocating gravity accumulating conveyers are that such conveyers require a change in elevation between the ends of the conveyer and that such conveyers can transport loads only in the downhill direction.

Various types of conveyers in which the rollers are driven or rotated to cause the loads in contact with the rollers to be conveyed are also known in the prior art. Many of the drive mechanisms for rotating rollers in such prior art conveyers are either unsuitable for driving rollers when heavy loads are to be conveyed or are unsuitable for use in accumulating conveyer systems. The drive mechanisms for accumulating conveyers utilize various types of clutch mechanisms to permit the rollers to cease rotating when the load comes to a halt (e.g., at the end of the conveyer). It is also known to employ in a roller conveyer driven rollers wherein a rotary load-engaging roller portion is in permanent frictional engagement with a driving portion. In such prior art conveyers, however, the permanent frictional engagement between such portions causes overheating and considerable wear so that the magnitude of forces with which the driving portion transmits torque to the driven portion varies in response to several factors, including progressive wear on such portions. Overheating can cause excessive frictional engagement between driving and driven portions so that the driven portion continues to rotate when the load is at a standstill or so that the load travels with reference to the driven portion when it is desired to advance the load at a speed which is higher than the speed transmitted thereto by the driving portion when the driven portion rotates with the driving portion. One example of a conveyer in which rollers are driven by frictional engagement between a driving portion and a driven portion is described in U.S. Pat. No. 4,111,087 issued to Pankratz et al. (see FIG. 4 and col. 5, lines 32–61 of the Pankratz et al. patent).

The present invention utilizes a drive mechanism of the type in which a rotary load-engaging roller portion is in permanent frictional engagement with a driving portion. However, by use of a friction pad, the present invention overcomes the problems of overheating and excessive frictional engagement which exist with prior art devices. The present invention provides a drive mechanism particularly suitable for rotating rollers in an accumulating conveyer system for conveying a wide range of loads, including relatively heavy loads.

SUMMARY OF THE INVENTION

The present invention provides an accumulating conveyer in which selected rollers of the conveyer are driven by means of an improved drive mechanism. The drive mechanism permits a load-engaging roller tube to stop rotating without interrupting the application of driving power to the roller. The drive mechanism for the roller causes the driven portion of the roller (i.e., the portion including the roller tube) to slip with respect to a driving portion of the roller when a predetermined resistance to rotation is applied to the roller tube. Only selected ones of the rollers in the accumulating conveyer have a drive mechanism, the number and spacing of rollers with drive mechanisms being determined by characteristics of the loads to be conveyed so as to use a minimum number of rollers having such drive mechanisms.

More specifically, the present invention provides an improved mechanism having a driving portion and a driven portion for each powered roller, but wherein the driven portion slips with respect to the driving portion of the roller when the resistance to rotation exceeds a predetermined force. The present invention utilizes a compression spring to hold a driving disc and a roller disc in contact with a friction pad which is sandwiched between them. The roller disc is rigidly attached to the roller tube so that the roller disc and roller tube rotate conjointly, and the driving disc is rigidly attached to a drive shaft so that the driving disc and drive shaft rotate conjointly. The drive shaft of each roller supplies torque to rotate the roller. When the driving disc and roller disc are held in contact with the friction pad with sufficient force by the compression spring, the two disc members rotate conjointly so that the rotation or torque of the drive shaft is transmitted to the roller tube. The amount of friction between the two disc members and the friction pad is determined by the force applied by the compression spring, the compression of which can be adjusted by threads on the end of the drive shaft. The compression spring is adjusted to provide sufficient friction between the friction pad and the driving disc and the roller disc to cause the roller tube to rotate under normal loads. When a load is halted over a roller by contacting a barrier or a load ahead of it (i.e., for load-to-load accumulation), or when a brake is applied to the roller (i.e., for zone accumulation), the amount of force resisting rotation of the roller tube is increased so that the friction supplied by the compression spring against the friction pad is not sufficient to cause the driving disc and the roller disc to rotate conjointly. As a result, at least one of the two disc members slips against the friction pad and the torque provided by the drive shaft is not sufficient to rotate the roller tube.

Column (i.e. load-to-load) accumulation is provided by the present invention when the leading load on the conveyer engages a stop or barrier thereby causing the driving force between the driven portions and the driving portions of the powered rollers beneath that load to be overcome so that the driven portions stop rotating. Successive loads react in a similar manner as they come to rest against preceding loads. When the leading load is removed from the conveyer, the succeeding loads advance until the next successive load engages the stop.

Zone accumulation is provided by the present invention when a leading load actuates a switch mechanism as it engages a barrier or stop. The switch mechanism causes a brake to be applied against the surface (i.e., against the roller tube) of the driven portion of a selected roller upstream from the load which actuated the switch mechanism. Application of the brake causes the driving force to be overcome and the driven portion to stop rotating so that the next load on the conveyer will stop when it reaches the preceding zone in which the roller tube has been stopped from rotating. This sequence is repeated for successive loads and successive zones. When the leading load is removed, the sequence is reversed, at which time the next successive leading load advances until it engages the stop and each of the succeeding loads advances into the next zone.

Accordingly, it is an object of the present invention to provide an accumulating conveyer suitable for carrying a wide range of loads, including heavy loads, and which is capable of operating either with or without any change in elevation between the ends of the conveyer and which can transport loads in either direction.

It is a further object of the present invention to provide an accumulating conveyer for which the end pressure which exists when loads are accumulated load-to-load can be controlled.

It is another object of the present invention to provide an accumulating conveyer capable of zone accumulating wherein zones are effectuated by stopping the rotation of selected roller tubes by application of a brake against the surface of each of the selected roller tubes.

This and other objects, advantages, and features shall hereinafter appear, and for purposes of illustration, but not for limitation, exemplary embodiments of the present invention are illustrated in the accompanying drawings.

BRIEF DESCRIPTION OF THE DRAWINGS

FIG. 1 is a view of the roller drive mechanism for coupling the torque from the drive shaft to the roller tube.

FIG. 2 is a schematic view of a zone accumulating embodiment of the accumulating conveyer of the present invention.

FIG. 3 is a perspective view illustrating a load sensing mechanism and a brake mechanism which are utilized in conjunction with each other to provide a zone accumulating embodiment of the present invention.

FIG. 4 is another view illustrating a load sensing mechanism and a brake mechanism which are utilized in conjunction with each other to provide a zone accumulating embodiment of the present invention.

FIG. 5 is a view illustrating an adjustment mechanism which can be utilized to adjust the driving force between the driving portion and the driven portion of a roller.

DETAILED DESCRIPTION OF THE PREFERRED EMBODIMENT

The present invention provides a drive mechanism 12 (see FIG. 1) which is positioned at the end of selected rollers 14 in an accumulating conveyer 10. Non-driven rollers 13 (see FIG. 4) are also provided to support the loads being conveyed. The number and spacing of driven rollers 14 and non-driven rollers 13 is determined by the size, weight, and surface characteristics of the loads to be conveyed. Shorter or heavier loads or loads having uneven surfaces require relatively more driven rollers 14. Longer or lighter loads or loads having even surfaces permit relatively more non-driven rollers 13 to be used. The rollers 13 and 14 are mounted between frame members 16 and 18 of the conveyer 10. The roller tube 15 surrounds the drive shaft 32 and drive mechanism 12, and is the portion of rollers 13 and 14 which engages the loads being conveyed. The conveyer 10 is supported by suitable supports 20 and 22 as illustrated in FIG. 2. Depending upon the length of conveyer 10 and the weight of the loads to be conveyed, additional suitable supports can be utilized. Each roller 13 and 14 is supported at its ends on a drive shaft 32 by antifriction support shaft bearings 24 and 26. Each drive shaft 32 is supported by antifriction support shaft bearings 28 and 30, which are mounted in frame members 16 and 18, respectively. Sprocket 34 is splinably mounted on drive shaft 32 of driven rollers 14 so as to rotate conjointly therewith while permitting sprocket 34 to slide axially on drive shaft 32. Power is applied via a roller chain 36 to cause the sprocket 34 and drive shaft 32 to rotate. The roller chain 36 is driven by suitable driving means 38 in a conventional manner as illustrated schematically in FIG. 2. It should be noted that non-driven rollers 13 can also be provided with sprockets 34. In that case, a limited torque which aids in conveying loads is provided to roller tubes 15 of non-driven rollers 13 due to the friction associated with bearings 24 and 26.

Torque is transmitted from the drive shaft 32 to the roller tube 15 by the drive mechanism 12 as illustrated in FIG. 1. More specifically, drive mechanism 12 transmits the rotation of drive shaft 32 to roller tube 15 when the resistance to rotation of roller tube 15 provided by the load does not exceed a predetermined value. To achieve this coupling of drive shaft 32 to roller tube 15, a spring 40 is compressed between spring compression plate 42 and driver disc 44. Spring compression plate 42 is held in a fixed, axial position on drive shaft 32 by roll pin 46 on the one side and spring 40 on the other side. The force provided by spring 40 against spring compression plate 42 maintains spring compression plate 42 in a position abutting against roll pin 46. The other end of spring 40 abuts against driving disc 44. Driving disc 44 is splinably but slidably mounted to drive shaft 32 so as to rotate conjointly therewith while being slidable in an axial direction. Friction pad 48 is sandwiched between driving disc 44 and roller disc 50. Roller disc 50 is rigidly mounted, or mechanically coupled, to roller tube 15 so as to rotate conjointly therewith. When sufficient force is supplied by spring 40, driving disc 44 is held tightly against one side of friction pad 48 and the other side of friction pad 48 is held tightly against roller disc 50. As a result, the friction between the one surface of friction pad 48 and driving disc 44 and between the other surface of friction pad 48 and roller disc 50 is sufficient to cause driving disc 44, friction pad 48, and roller disc 50 to rotate conjointly. Thus, rotation of drive shaft 32 is transmitted to roller tube 15 so that they rotate together. However, when the resistance to rotation of roller tube 15 is provided by the load contacting roller tube 15 is sufficiently great, the friction between the one surface of friction pad 48 and driving disc 44 and the friction between the other surface of friction pad 48 and roller disc 50 is not sufficient to prevent driving disc 44 and roller disc 50 from slipping relative to friction pad 48 (i.e., the driving force supplied via drive shaft 32 is overcome). This slippage uncouples roller tube 15 from drive shaft 32 so that roller tube 15 ceases to rotate. Friction pad 48 can be made of material similar to the type of material used for brake pads in various applications including, for example, automobile wheel brakes.

The weight of the loads which can be carried on roller tube 15 without causing driving disc 44 and roller disc 50 to slip against friction pad 48 is determined by the force applied by spring 40. The greater the force applied by spring 40, the greater the load that can be carried by roller tube 15 without slippage. The force applied to driving disc 44 by spring 40 can be varied by adjusting the distance between spring compression plate 42 and driving disc 44 (i.e., by adjusting the degree to which spring 40 is compressed). This distance can be adjusted in the present invention by sliding drive shaft 32 towards or away from roller disc 50 thereby sliding spring compression plate 42 relative to driving disc 44. This is accomplished by slidably mounting sprocket 34 on drive shaft 32 such that drive shaft 32 can move axially with respect to sprocket 34 while sprocket 34 remains in a permanent axial position aligned with chain 36. Drive shaft 32 can be a hexagonal shaft, for example, with sprocket 34, spring compression plate 42, and driving disc 44 having hexagonal holes through which the drive shaft 32 is mounted.

In one embodiment of the present invention (see FIG. 1) the end of drive shaft 32 opposite sprocket 34 has threads 52 on which is threaded a nut 54. Rotating nut 54 thereby causes drive shaft 32 to move in an axial direction with respect to bearing 30 and frame member 18. Thus, adjusting nut 54 adjusts the compression of spring 40, and, hence, the weight of the load which can be carried by roller tube 15 without slippage occurring. Shield 56, when in place, prevents unauthorized tampering with the adjustment of nut 54.

A second embodiment of this feature of the present invention is illustrated in FIG. 5. In this embodiment, the end of drive shaft 32 has a hole 53 that is internally threaded to receive a cap screw 55. The cap screw 55 is supported by pipe 57 and washer 57a and is threaded into hole 53. The head 55a of cap screw 55 can have a socket (not shown) or a slot (not shown) to permit cap screw 55 to be adjusted with an Allen wrench or a screwdriver, respectively. Shield 56 can have a hole 56a (see FIG. 1) for permitting an Allen wrench or screwdriver to be inserted into the socket or slot in head 55a of cap screw 55.

In one embodiment of the present invention, load-to-load or column accumulation is provided. For load-to-load accumulation, each load 66 (see FIG. 2) is moved along conveyer 10 by the rotation of roller tubes 15 until a barrier or restraint 68 is reached (i.e., in FIG. 2 the loads are moved from left to right). When a leading load 66′ is restrained from moving by barrier 68, the force tending to prevent rotation of roller tube 15 of driven roller 14 is increased sufficiently to overcome the driving force between the driven roller tube 15 and the associated drive shaft 32. Thus, roller tube 15 of the driven roller 14 beneath load 66′ ceases rotating as load 66′ comes to barrier 68. Roller tube 15 will cease rotating due to slippage of driving disc 44 and roller disc 50 against friction pad 48 when the load is restrained due to the increased resistance to rotation of the roller tube 15 beneath the restrained load. This prevents the roller tube 15 from continuing to rotate and thereby wearing against a load that has been halted. Roller tubes 15 of driven rollers 14 beneath succeeding loads 66 react in the same way when the succeeding loads come to rest against a preceding load. When the leading load 66′ is removed from conveyer 10, successive loads 66 advance until barrier 68 is engaged by the next successive leading load 66″, at which time the succeeding loads accumulate behind it in the manner described.

In a second embodiment of the present invention, zone accumulation of loads is provided. With zone accumulation a spaced relation is maintained between loads as the loads accumulate, i.e., come to rest on the conveyer. FIGS. 2, 3, and 4 illustrate an actuating roller 58 pivotably mounted between frame member 16 and frame member 18. When a load 66 (see FIG. 2) passes actuating roller 58, actuating roller 58 pivots downward (see FIGS. 3 and 4) thereby actuating an air limit switch or valve (not shown). After the load has moved beyond actuating roller 58, a counter bias (not shown) causes actuating roller 58 to pivot back to its normal position projecting above roller tubes 15 with the associated air limit switch or valve (not shown) not actuated. Actuation of the air limit switch or valve (not shown) causes a conventional pneumatic system (not shown) to apply a brake pad 64 directly against the surface of roller tube 15 upstream of the load 66 which engaged an associated actuating roller 58. A brake pad 64 is urged against an associated roller tube 15 when an air bag 62 is inflated by the pneumatic system (not shown) in a convential manner. It should be understood that the function of the limit air switch or valve (not shown) could be accomplished in a variety of ways including, for example, by a photocell and light beam arrangement. Also, brake pad 64 could be urged against roller tube 15 by conventional mechanical means other than a pneumatic system.

Application of brake pad 64 to a roller tube 15 stops the rotation of roller tube 15. Thus, the driving force between the driven roller tube 15 and the drive shaft 32 is overcome. When a brake 64 is applied to a roller tube 15 by inflation of air bag 62, the drive shaft 32 of the roller 14 is uncoupled from the roller tube 15 by slippage of driving disc 44 and roller disc 50 on friction pad 48. Hence, a load will come to rest when it is positioned over a roller tube 15 to which a corresponding brake pad 64 has been applied.

Zone accumulation is accomplished using the foregoing arrangement as illustrated in FIG. 2. When load 66′ is restrained by barrier 68, actuating roller 58′ is engaged by load 66′ and is pivoted thereby actuating an associated air limit switch or valve (not shown), which causes air bag 62′ to be inflated by the pneumatic system (not shown). Inflation of air bag 62′ urges brake pad 64′ against a roller tube 15′ in the preceding zone. Thus, roller tube 15′ stops rotating, which in turn prevents load 66″ from being conveyed forward. Similarly, load 66″ is positioned over actuating roller 58″ such that actuating roller 58″ is pivoted thereby actuating an associated air limit switch or valve (not shown). Actuation of the air limit switch or valve causes air bag 62" to be inflated which urges brake pad 64" against roller tube 15" in the preceding (i.e., upstream) zone. Consequently, roller tube 15" stops rotating, which in turn prevents load 66''' from being conveyed forward. The process of pivoting actuating rollers 58 to actuate air limit switches and apply brake pads 64 repeats to stop successive loads in successive zones on conveyer 10. When the leading load 66' is removed, actuating roller 58' is released thereby causing brake pad 64' to release roller tube 15'. Hence load 66" advances to barrier 68. In a similar manner successive roller tubes 15 are released and successive loads are advanced to the next succeeding zone.

Since actuating rollers 58 are pivoted so as to actuate an air limit switch each time a load passes over them, brake pads 64 are urged against corresponding roller tubes 15 thereby halting them as loads proceed along the accumulating conveyer. Consequently, each load positioned over a roller tube 15 that is halted is delayed until the load ahead of (i.e. downstream from) it is conveyed beyond the corresponding actuating roller 58. As a result loads maintain a spaced relationship as they proceed along the accumulating conveyer.

While the preferred embodiment of the invention has been illustrated and described, it is to be understood that the invention is not limited to the precise construction herein disclosed, and the right is reserved to all changes and modifications coming within the scope of the invention as defined in the appended claims.

We claim:

1. A drive mechanism for a conveyer, said drive mechanism comprising:
   a drive shaft;
   power means coupled to said drive shaft for causing said drive shaft to rotate;
   a friction pad having first and second frictional sides and being rotatably and slidably mounted on said drive shaft;
   a driving disc slidably mounted on said drive shaft so as to be adjustable in an axial direction, said driving disc also being mounted on said drive shaft so as to rotate conjointly with said drive shaft, and said driving disc being positioned so that one surface of said driving disc is in contact with the first frictional side of said friction pad;
   a roller tube for engaging loads;
   a roller disc mechanically coupled to said roller tube so as to rotate conjointly with said roller tube, said roller disc being positioned so that one surface of said roller disc is in contact with the second frictional side of said friction pad;
   bias means for urging said driving disc against the first frictional side of said friction pad and the second frictional side of said friction pad against said roller disc, whereby when said roller tube engages a resistance that is less than a predetermined value the friction between said friction pad and said driving disc and said roller disc causes said roller tube to rotate with said drive shaft.

2. The drive mechanism as claimed in claim 1 wherein said bias means further comprises:
   spring compression plate means mounted on said drive shaft in a fixed axial position with respect to said drive shaft; and
   a compression spring mounted concentric with said drive shaft, said compression spring being positioned between said spring compression plate means and said driving disc.

3. The drive mechanism as claimed in claim 2 wherein said drive shaft is slidably mounted with respect to said roller disc so that the compression of said compression spring is adjustable by sliding said drive shaft in either axial direction to increase or decrease the distance between said spring compression plate means and said roller disc, thereby adjusting the resistance of the load that can be engaged by said roller tube without causing said driving disc and said roller disc to slip on said friction pad.

4. The drive mechanism as claimed in claim 3 wherein said drive shaft is threaded on one end, said drive mechanism further comprising:
   a support member rigidly mounted and having an opening therein through which the threaded portion of said drive shaft projects; and
   a nut threaded onto said drive shaft, whereby adjustment of the axial position of said drive shaft is accomplished by rotating said nut thereby drawing said drive shaft towards or away from said support member, depending upon the direction of rotation of said screw.

5. The drive mechanism as claimed in claim 3 wherein said drive shaft has an axial hole in one end, the hole being threaded, said drive mechanism further comprising:
   a support member rigidly mounted and having an opening therein, the opening in said support member being aligned with the hole in said drive shaft; and
   screw means, said screw means being inserted through the opening in said support member and into the hole in said drive shaft, whereby adjustment of the axial position of said drive shaft is accomplished by rotating said screw means thereby drawing said drive shaft towards or away from said support member, depending upon the direction of rotation of said screw means.

6. An accumulating conveyer for handling loads, said accumulating conveyer comprising:
   a plurality of drive shafts;
   power means coupled to each of said drive shafts for causing each of said drive shafts to rotate;
   a plurality of friction pads, each of said friction pads being rotatably and slidably mounted on one of said drive shafts;
   a plurality of driving discs, each of said driving discs being slidably mounted on one of said drive shafts so as to be adjustable in an axial direction on said drive shaft and to rotate conjointly with said drive shaft, each of said driving discs being positioned so that it is in contact with one of said friction pads;
   a plurality of roller tubes for engaging loads, each of said roller tubes being rotatably mounted on one of said drive shafts;
   a plurality of roller discs, each of said roller discs being coupled to one of said roller tubes so as to rotate conjointly with said roller tube to which it is coupled, each of said roller discs being positioned so that it is in contact with one of said friction pads; and
   a plurality of adjustable bias means for urging said driving discs and said roller discs against said friction pads, whereby when each of said roller tubes engages a resistance to rotation that is less than a predetermined value the friction between the associated one of said friction pads and the associated one of said driving discs and the associated one of said roller discs causes said roller tube to rotate with the associated one of said drive shafts, and whereby when each of said roller tubes engages a resistance that is greater than a predetermined value the friction between the associated one of said friction pads and the associated one of said driving discs and the associated one of said roller discs is insufficient to cause said roller tube to rotate with the associated one of said drive shafts thereby halting the rotation of said roller tube.

7. An accumulating conveyer as claimed in claim 6 further comprising stop means for engaging and restraining a first load, whereby when a first load is engaged and restrained by said stop means said roller tubes located beneath the first load thereby engage a resistance greater than the predetermined value and cease rotating, and whereby the next successive load is engaged and restrained by the first load when it is conveyed into contact with the first load and said roller tubes located beneath the next successive load thereby engage a resistance greater than the predetermined value and cease rotating, and whereby a similar process occurs with respect to each succeeding load.

8. An accumulating conveyer as claimed in claim 6 further comprising:
a plurality of operating means, each operating means being associated with a predetermined zone on the accumulating conveyer;
a plurality of brake means, each of said brake means being positioned so as to engage one of said roller tubes when said brake means is operated by an associated one of said operating means;
a plurality of actuating means, each of said actuating means actuating a corresponding one of said operating means in response to the presence of a load within a predetermined zone on the accumulating conveyer; and
stop means for engaging and restraining a load, whereby when a load is engaged and restrained by said stop means one of said actuating means actuates said operating means corresponding to a first preceding zone, thereby operating said brake means associated with said operating means associated with the first preceding zone and causing said brake means to engage one of said roller tubes in the first preceding zone and thereby cause said roller tube to cease rotating, and whereby when a load reaches the first preceding zone it stops due to said roller tube having ceased rotating and another of said actuating means actuates said operating means associated with a second preceding zone, thereby operating said brake means associated with said operating means associated with the second preceding zone and causing said brake means to engage one of said roller tubes in the second preceding zone and thereby cause said roller tube to cease rotating, and whereby a similar process occurs with respect to each successive preceding zone.

9. An accumulating conveyer as claimed in claim 8 wherein each of said actuating means further comprises:
a pivotably mounted actuating roller; and
switch means actuated by said actuating roller when said actuating roller is pivoted by a load positioned over it.

10. An accumulating conveyer as claimed in claim 8 wherein each of said operating means further comprises a pneumatic system.

11. An accumulating conveyer as claimed in claim 10 wherein each of said brake means further comprises:
an air bag for being inflated and deflated by said pneumatic system; and
a brake pad mounted on said air bag such that when said air bag is inflated by said pneumatic system said brake pad is moved so that it engages one of said roller tubes thereby causing said roller tube to cease rotating.

12. An accumulating conveyer as claimed in claim 6 further comprising a plurality of non-driven rollers for supporting loads.

13. An accumulating conveyer as claimed in claim 12 wherein said non-driven rollers are spaced between said roller tubes driven by said power means so that there is at least one roller driven by said power means within each predetermined zone of the accumulating conveyer, said accumulating conveyer further comprising:
a plurality of operating means, each operating means being associated with a predetermined zone on the accumulating conveyer;
a plurality of brake means, each of said brake means being positioned so as to engage one of said roller tubes when said brake means is operated by an associated one of said operating means;
a plurality of actuating means, each of said actuating means actuating a corresponding one of said operating means in response to the presence of a load within a predetermined zone on the accumulating conveyer, whereby when a load is present within a predetermined zone an associated one of said actuating means actuates the corresponding one of said operating means thereby operating an associated brake means causing it to engage an associated one of said roller tubes thereby causing the roller tube to cease rotating.

14. An accumulating conveyer as claimed in claim 6 further comprising:
stop means for engaging and restraining a load, wherein when a load is engaged and restrained by said stop means the increase in the resistance opposing rotation of said roller tube in contact with the restrained load causes said roller disc associated with said roller tube to slip against said friction pad thereby causing said roller tube to cease rotating.

15. A drive mechanism for a conveyer, said drive mechanism comprising:
a drive shaft;
power means coupled to said drive shaft for causing said drive shaft to rotate;
driving disc means mounted on said drive shaft so as to rotate conjointly with said drive shaft;
a roller tube; roller disc means mechanically coupled to said roller tube 20 so as to rotate conjointly with said roller tube and wherein said driving disc means is positioned within said roller tube, whereby the length of the driving shaft is minimized; and
friction pad means in frictional engagement with said driving disc means and said roller disc means means, whereby the rotation of said drive shaft is transferred to said roller tube through said friction pad means.

16. The drive mechanism as claimed in claim 15 wherein said driving disc means is slidably mounted on said drive shaft so as to be slidable in an axial direction and further comprising bias means for urging said driving disc means and said roller disc means against said friction pad means, whereby when the resistance opposing rotation of said roller disc means is less than a predetermined value the friction between said friction pad means and said driving disc means and said roller disc means causes torque provided by said power means to be coupled to said roller disc means.

17. The drive mechanism as claimed in claim 16 wherein the amount of bias provided by said bias means is adjustable, whereby the maximum amount of resistance opposing rotation of said roller disc means with which torque is still coupled from said driving disc means to said roller disc means is adjustable.

18. The drive mechanism as claimed in claim 16 wherein said bias means further comprises compression spring means having one end mounted at a fixed axial position with respect to said drive shaft and the other end compressingly engaging said roller disc means so as to urge said roller disc means against said friction pad means and said driving disc means, whereby axial movement of said drive shaft adjusts the compression provided by said compression spring means.

19. The drive mechanism as claimed in claim 18 wherein the axial position of said drive shaft is adjustable by thread means mounted at an end of said drive shaft.

20. The drive mechanism as claimed in claim 19 wherein the end of said drive shaft having said thread means is covered by shield means, said shield means having an opening for providing access to said thread means, whereby the axial position of said drive shaft is adjustable through the opening in said shield means without changing the position of said shield means.

21. The drive mechanism as claimed in claim 15 wherein said drive shaft is mounted between two parallel frame members and is supported in each of said frame members by anti-friction bearing means.

22. The drive mechanism as claimed in claim 1 wherein said bias means is positioned within said roller tube, whereby the length of said drive shaft is minimized.

23. A drive mechanism for a conveyer, said drive mechanism comprising:
a drive shaft;
power means coupled to said drive shaft for causing said drive shaft to rotate;
driving disc means mounted on said drive shaft so as to rotate conjointly with said drive shaft;
a roller tube for engaging loads;
roller disc means coupled to said roller tube so as to rotate conjointly with said roller tube; and
friction pad means in frictional engagement with said driving disc means and said roller disc means, whereby the rotation of said drive shaft is transferred to said roller tube through said driving disc means, said friction pad means and said roller disc means.

24. The drive mechanism as claimed in claim 23 further comprising:
compression spring means having one end mounted at a fixed axial position with respect to said drive shaft and the other end urging said driving disc means against one side of said friction pad means and the other side of said friction pad means against said roller disc means.

25. The drive mechanism as claimed in claim 24 wherein the amount of bias provided by said compression spring means is adjustable, whereby the maximum amount of force opposing rotation of said driven means under which torque is still coupled from said driving disc means to said roller disc means is adjustable.

26. The drive mechanism as claimed in claim 25 wherein the amount of bias provided by said compression spring is adjustable by adjusting the axial position of said drive shaft.

27. The drive mechanism as claimed in claim 26 wherein the axial position of said drive shaft is adjustable by thread means mounted at an end of said drive shaft.

28. The drive mechanism as claimed in claim 27 wherein the end of said drive shaft having said thread means is covered by shield means, said shield means having an opening providing access to said thread means, whereby the axial position of said drive shaft is adjustable through the opening in said shield means without changing the position of said shield means.

29. A drive mechanism for a conveyer, said drive mechanism comprising:
a drive shaft;
power means coupled to said drive shaft for causing said drive shaft to rotate;
a roller tube for engaging loads;
friction pad means;
a roller disc coupled to said roller tube so as to rotate conjointly with said roller tube, said roller disc being positioned within said roller tube so that one surface of said roller disc is in contact with said friction pad means;
a driving disc slidably mounted on said drive shaft so as to be slidable in an axial direction, said driving disc also being mounted so as to rotate conjointly with said drive shaft, and said driving disc being positioned within said roller tube so that one surface of said driving disc is in contact with said friction pad means; and
bias means for urging said driving disc and said roller disc against said friction pad means, whereby when the resistance opposing rotation of said roller disc is less than a predetermined value the friction between said friction pad means and said driving disc and said roller disc causes torque provided by said power means to be coupled to said roller disc.

* * * * *